Feb. 24, 1959

D. K. FROMAN 2,875,143

PUSH-PULL POWER REACTOR

Filed July 16, 1956

WITNESSES:

INVENTOR.
Darol K. Froman
BY

Feb. 24, 1959

D. K. FROMAN 2,875,143

PUSH-PULL POWER REACTOR

Filed July 16, 1956

INVENTOR.
Darol K. Froman

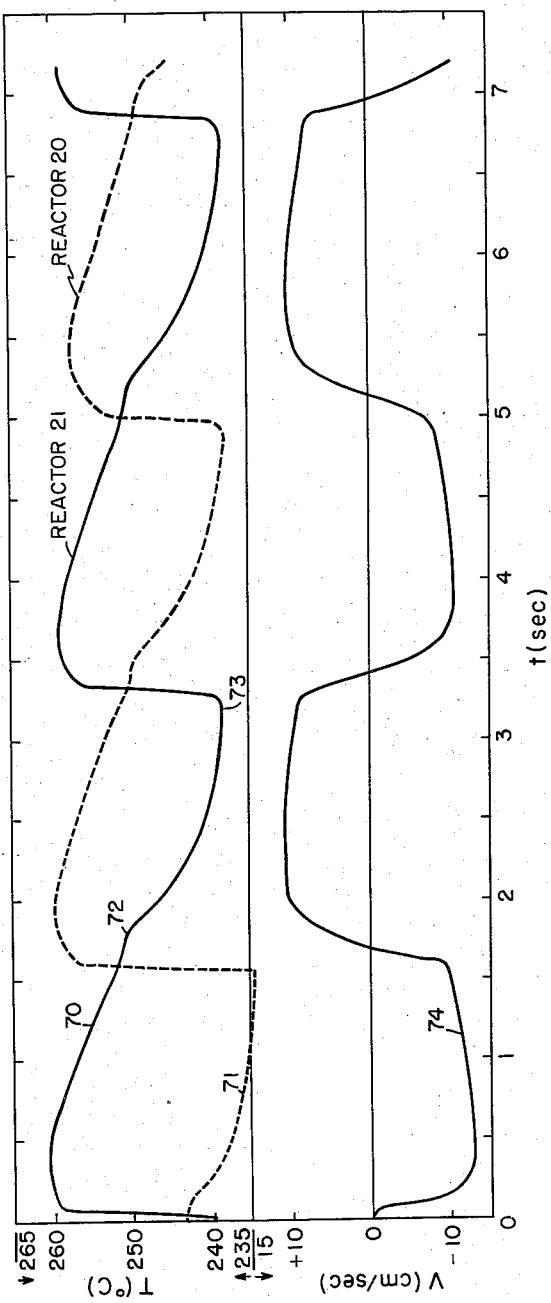

United States Patent Office 2,875,143
Patented Feb. 24, 1959

2,875,143

PUSH-PULL POWER REACTOR

Darol K. Froman, Los Alamos, N. Mex., assignor to the United States of America as represented by the United States Atomic Energy Commission Application July 16, 1956, Serial No. 598,219

14 Claims. (Cl. 204—154.2)

The present invention relates to nuclear reactors and more particularly to homogeneous nuclear reactors utilizing a liquid fuel.

The nuclear reactor of the present invention is a reactor of the homogeneous liquid fuel type and is described as particularly suitable for use in power generating facilities.

Homogeneous reactors of the prior art rely on either convection circulation of the liquid fuel or upon complicated mechanical apparatus for circulating the liquid fuel through heat exchanging apparatus. Further, these reactors generally utilize uranium-water solutions which involve the complex problems associated wtih radiolytic dissociation of the water and the consequent problems of either recombining these radiolytic gases or of safely venting them to the atmosphere. However, the use of homogeneous reactors for power production has well-known advantages, i. e., inherently safe operation because of the negative temperature coefficient of reactivity and comparative ease in recovering the fissionable material and products thereof from the fuel.

The present invention overcomes some of the problems of the prior art reactors and utilizes a new and novel method for circulating the liquid fuel through a heat exchanger. The preferred embodiment does not require the gas handling and exhaust apparatus generally associated with reactors of the prior art, and overcomes the difficulties and hazards generally associated with the prior art liquid fuel circulating systems.

The reactor system of the present invention consists generally of two reactors which are connected through heat exchanging apparatus. Each reactor contains a critical geometry region and a vapor region separated by a baffle. The vapor regions are non-critical either by geometry or neutron absorbers. In the preferred embodiment the heat exchanger apparatus is located external of the two reactors and is non-critical by geometry. However, it is within the purview of this invention to provide one pressure vessel having the critical regions located at opposite ends thereof and containing heat exchanging apparatus.

Although the description of the preferred embodiment is specific to an average power level of approximately 1 megawatt at which the average thermal neutron flux would be of the order of $1.5 \times 10^{13}$ neutrons/cm.$^2$-sec. using ordinary water as a moderator, appropriate changes in the size of the critical region, heat exchanging capacity and time interval between neutron bursts may be made to provide a power output of either larger or smaller value.

The preferred embodiment of the present invention provides for the circulation of the liquid fuel through the heat exchanger by means of the vapor pressure created in the vapor region above the critical region. Thus, when the liquid in the first critical region becomes critical, nuclear power will be generated. The energy from the nuclear reactions will heat the liquid fuel and raise its temperature, thereby increasing the vapor pressure above the liquid fuel. The increased vapor pressure will force the liquid fuel out of the critical region through the heat exchanger and into the second critical region. As the liquid fuel in the second critical region reaches a condition of criticality the pressure created in the vapor region of the second reactor, through the evolution of energy in that reaction region, will force the liquid fuel back through the heat exchanging apparatus to the first critical region. This method of circulating the liquid fuel provides a safe, simple and positive means for moving the liquid fuel through the heat exchanger, eliminates the necessity for any moving parts in the reactor, and provides a self-regulating system.

The critical region of each reactor is such that when a predetermined portion of this region is filled with a liquid fuel, a condition of nuclear criticality is reached and the liquid fuel heats itself and expands to fill at least the total volume of the critical region. The critical region will have an excess $k$, but the excess will not be prohibitively large. This can be seen by considering that the critical region will never be filled with cold solution because the amount of heat extracted from the liquid fuel upon passing through the heat exchanging apparatus is predetermined so that the liquid fuel moving into either critical geometry region will have a controlled temperature. The injection and/or expansion of the liquid fuel in the critical geometry region will result in a gain in reactivity determined by the geometry and temperature. The liquid fuel above the bottom of the baffle will have little effect upon the reactivity of the critical region since, for the time interval during which the liquid fuel exceeds the baffle height, the criticality of the system is governed only by the temperature. Thus the negative temperature coefficient of reactivity will control the maximum temperature which can be reached in the liquid fuel.

Thus, it is apparent that the reactor system of the present invention requires that a predetermined relation exists between the temperature at which the liquid fuel first becomes critical and the temperature at which the pressure in the vapor volume is of sufficient value to force the liquid fuel into the second critical geometry region. Furthermore, the pressure in the vapor region above the first critical region must have a sufficiently high value to insure that the second critical geometry region will be filled with the minimum critical volume of liquid fuel, against the back pressure existing in the vapor region of the second critical region at the particular temperature.

Therefore, it is an object of the present invention to provide a homogeneous liquid fuel nuclear reactor system in which a liquid fuel is circulated through a heat exchanger by means of the vapor pressure created above the critical region.

Another object of the present invention is to provide such a nuclear reactor system which neither requires mechanical means for circulating the fuel nor relies upon a temperature gradient to create convection currents.

A further object of the present invention is to provide such a nuclear reactor system having two critical geometry regions connected through a heat exchanger.

A still further object of the present invention is to provide such a nuclear reactor system which is so designed and constructed that the temperature of the liquid fuel in a critical region cannot attain a value higher than a predetermined maximum.

Other objects and advantages of the present invention will become apparent from the following description including the drawing hereby made a part of the specification wherein:

Figure 6 is a graph of the temperature of the liquid fuel in the two critical regions as a function of time; and Figure 7 is a graph of the velocity of the liquid fuel into and out of the critical regions.

Table I is a summary showing the order of magnitude of the various reactor specifications for the preferred embodiment.

TABLE I

| | |
|---|---|
| Power | 1 megawatt. |
| Fuel | About 90% enriched $UO_3$ in $H_3PO_4$. |
| Moderator | Water. |
| Solution: | |
|    Composition | ~0.6 M $UO_3$ in 5.6 M $H_3PO_4$. |
|    Power density (average) | ~60 kw./liter. |
|    Critical mass | ~2.5 kg. $U^{235}$. |
|    Total fissionable material | ~5.2 kg. $U^{235}$. |
|    Max. operating temperature | 260° C. |
|    Max. oper. press. (excluding radiolytic gas and overpressure) | ~600 p. s. i. |
| Vessel: | |
|    Critical region | 12" dia. x 9" high cylinder. |
|    Volume of vapor regions | 0.59 cu. ft. |
|    Volume of critical region | 0.59 cu. ft. |
|    Volume of heat exchanger | 0.59 cu. ft. |
|    Composition | Stainless steel with gold cladding. |
| Control: | |
|    Rods | $B^{10}$ canned in steel—1" dia. thimble. |
|    Overpressure | 40 p. s. i. at 230° C. and equal solution level in each reactor. |
| Circulation of fuel: | |
|    Rate of cycle | ~1.5 sec. between consecutive bursts, ~3 sec. between bursts within same critical region. |
| Temperature rise in each cycle | 20–25°. |
| Min. temp. of fuel entering critical region | 225° C. |
| Temp. of fuel in critical region | 240–260° C. |
| Pressure in vapor space (excluding radiolytic gas and overpressure): | |
|    Before cycle | ~400 p. s. i. |
|    After cycle | ~600 p. s. i. |

Apparatus

Figure 1:
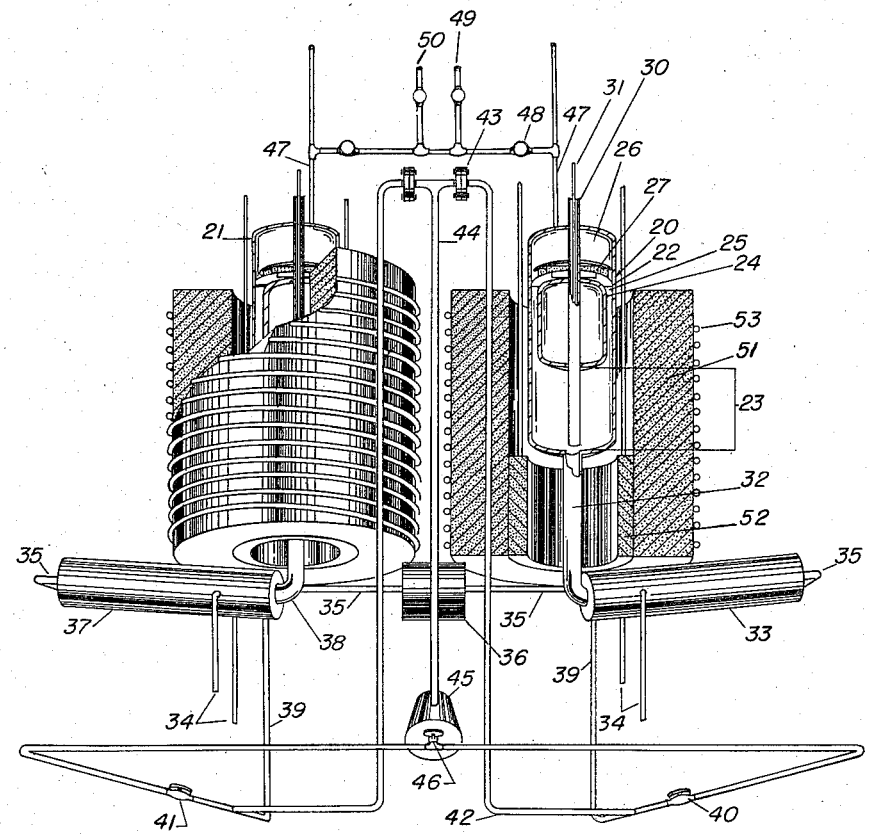
Figure 1 is a perspective view of the preferred embodiment of the present invention.

The preferred embodiment of the present invention is shown in Fig. 1. It consists in general of two identical reactors identified generally as 20 and 21. Only one of the reactors will be specifically described, since each contains the identical components. The reactor 20 consists of a closed vessel 22 (see Fig. 2) which has a critical geometry region or volume 23 in its bottom portion. The critical region 23 has a constant volume, i. e., liquid fuel above a baffle 24 is ineffective in adding to the reactivity of the critical geometry. Above the critical region 23 is located a baffle 24 which in the preferred embodiment is a hollow container. The baffle 24 is so centrally disposed as to create a cylindrical channel 25 which is non-critical by geometry.

It should be noted that in the preferred embodiment the baffle 24 is a hollow container which provides a channel 25 in which the liquid fuel would not be critical by geometry. However, it is within the purview of the present invention to provide baffles of other design, such as a flat plate which may have neutron absorbers located above it. The plate and/or poison will prevent the addition of reactivity to the critical region of the reactor. Located above baffle 24 is a vapor volume 26 which may be maintained non-critical by either geometry or the presence of neutron absorbing materials. Extending into the reactor through the vapor volume, the baffle 24, and into the critical region 23 is a safety rod thimble 30 which is sealed to the vessel 20 at the top and supports the baffle 24. Movably suspended within the safety rod thimble 30 is a safety rod 31 which is movable into and out of the critical region 23.

The vapor volume 26 contains a catalytic recombiner 27 which consists of two vertically spaced plates 28 supported by the safety rod thimble 30. A catalyst 29 is supported between the plates 28 and is preferably in the form of pellets. The catalyst 29 recombines the radiolytically dissociated water moderator, i. e., the hydrogen and oxygen are recombined to form water vapor. The preferred catalyst 29 consists of platinized alumina pellets in cylindrical form with dimensions of 3 mm. by 3 mm. and having 0.3 percent platinum by weight. The number of pellets required depends upon the amount of gas to be recombined. It is well known in the art that one such catalyst pellet will recombine 1 milliliter of hydrogen per minute with oxygen at 20° C. At higher temperatures the rate of recombination is increased. Thus at the operating temperature of the preferred embodiment the order of several thousand catalyst pellets would recombine the radiolytic gas. It should be noted that the radiolytic gas, if not recombined upon initial contact with the catalyst, is passed over the catalyst several times by the expansion and compression of the gases in the vapor region.

It should be noted, however, that although the preferred embodiment specifies the use of a catalyst for recombination of radiolytic gas, it is within the purview of the present invention to use operating temperatures sufficiently high with the preferred liquid fuels so that recombination of the hydrogen and oxygen is automatic at the higher temperature and pressure. The only structural changes required would be to omit the catalyst and to provide a strong enough system to withstand the pressures. Such systems using automatic recombination are described in co-pending application S. N. 589,835, filed June 6, 1956, by Bidwell et al. entitled "Nuclear Reactor Fuel Systems," the disclosure of which is incorporated herein by reference.

The bottom of the critical region 23 is connected through a conduit 32 to a heat exchanger 33. The heat exchanger 33 has coolant inlet and outlet pipes 34. A transfer conduit 35 is connected to conduit 32, through a throttling valve 36 to a second heat exchanger 37. The throttling valve 36, however, is not necessary, as is explained hereinafter. The transfer conduit 35 is connected to conduit 38 which enters the bottom of reactor 21. The components within the reactor 21 are the same as described for reactor 20. By-pass pipe 39 is connected to conduit 32 through valves 40 and 41 to conduit 38. The purpose of this by-pass connection is explained in detail hereinafter. By-pass conduit 39 is also connected through safety line 42 to a rupture disk 43, through reservoir line 44 to a reservoir 45. The reservoir 45 is connected through a valve 46 to by-pass conduit 39.

The reactor vessel 20 has a pressurizing line 47 which connects the vapor volume 26 through a valve 48 to a pressure supply line 49 and a vent line 50. The pressure supply line 49 is used to initially pressurize the vapor volume with a selected gas as explained in more detail hereinafter. The vent line 50 is utilized to vent the pressure within the vapor volume 26 of either or both reactors 20 and 21 as may be required during shutdown. Each reactor vessel 20 and 21 is surrounded by a stationary graphite reflector 51 which has a movable reflector portion 52 adjacent to the vessels 20 and 21. The movable portion 52 is used in temperature control and/or compensating for fuel burnup. The stationary graphite reflector 51 has an induction heater 53 around its periphery which is used during start-up.

The heat exchangers 33 and 37 have equal heat removing capacity and consist generally of a shell- and tube-type heat exchanger where the tube or tubes are surrounded by the water which is flowing through inlet and outlet pipes 34.

It should be noted that heat exchanger apparatus has approximately the same volume as one of the critical regions so that practically all of the liquid fuel which is passed through the heat exchanger during each cycle will be liquid fuel which has been heated in a critical region. Although these volumes do not necessarily need to be equal, maximum heat transfer is attained when they are equal.

The heat exchanger design will depend upon the approximate power to be developed by the reactor. Further, such a heat exchanger must be capable of extracting only that portion of the available thermal energy which will not lower the liquid fuel temperature, upon entering a critical region, below the minimum value, i. e., 225° C., for extracting 1 megawatt of thermal energy in the preferred embodiment. More thermal energy may be extracted with due consideration for safety, i. e., provided the solution temperature does not result in a prohibitively large excess $k$ when injected into a critical region. The minimum temperature, i. e., 225° in the preferred embodiment, may be maintained, for example, by adjusting the flow rate and input temperature of the coolant in pipes 34. However, it must remove sufficient thermal energy, i. e., lower the liquid fuel temperature so that the system will achieve a state of stable operation. This latter temperature, for the preferred embodiment, is approximately 240° C.

Liquid fuel

The preferred liquid fuel in the reactor of the present invention is a solution of enriched uranium phosphate and phosphoric acid in water, although other liquid fuels may be used. The uranium is preferably enriched in the fissionable isotope $U^{235}$ to a value of about 90%, however, other enrichments, as well as the enrichments of the isotope $U^{233}$, may be utilized in the liquid fuels. Specifically, the preferred liquid fuel has a composition of approximately 0.6 M $UO_3$ in 5.6 M $H_3PO_4$. The reactor using this liquid fuel is adequately reflected so that prompt criticality is attained for the solution height approximately equal to the baffle height, i. e., the bottom of the baffle, and at a temperature of 250° C. The volume coefficient of expansion of the fuel is such that at 250° C. the liquid has expanded to 1.18 times its room temperature value. Typical vapor pressure values are 280 and 710 p. s. i. at 225° C. and 275° C. respectively. The specific characteristics of the preferred liquid fuel and other liquid fuels which may be utilized are described in detail in above-referenced co-pending application S. N. 589,835.

Since the reactor of the present invention requires that a pressure be present in the vapor region 26, the effect of different vapor region pressures can be seen by considering that, in addition to the vapor above the liquid fuel solution there may be a non-condensable gas in the region. This may be uncombined radiolytic gas or a gas added to retard corrosion. Compression and expansion of this gas during each half cycle has an effect on the operation of the reactor. In general, this gas overpressure is one of the determining factors in regard to the minimum power at which the system will operate. Specifically, the higher the overpressure, the higher will be the minimum power level at which the system attains stable operation. Thus, in the system of the preferred embodiment the minimum power level for stable operation is of the order of three-quarters of one megawatt.

The temperature at which the liquid fuel enters the reactor is important for two reasons: (1) if the entry temperature is above a predetermined temperature the minimum power level will not be attained, i. e., stable operation is not possible; and (2) the entry of a large quantity of cold liquid fuel will result in prohibitively large excess reactivity. If the temperature of the liquid fuel entering a critical region is above a predetermined value, the system will not achieve a state of stable operating temperature. For stable operation the liquid fuel entering a reaction region of the preferred embodiment should have a temperature of not more than about 240° C., where 240° C. results in approximately minimum power operation. For entry temperatures lower than this predetermined temperature, the temperature rises during a burst and therefore average power will increase. However, there is also a lower limit for the entry temperature, for the reason that the preferred system is designed to operate at an average temperature of 250° C. and the introduction of liquid fuel at a temperature of 100° C., for example, will result in very large peak powers and very small $e$-folding times. Thus the minimum temperature value is determined by safety considerations, i. e., the $e$-folding time required for safe operation.

Operation

In starting up the reactor of the present invention, the liquid fuel is introduced into the critical regions by opening valve 46 and pressurizing reservoir 45 by means well known in the art to force the liquid fuel through conduit 32 into the reactors 20 and 21. The valve 46 is then closed. The safety rods 31 are maintained in their lowered position, as shown in Fig. 1. At this point the liquid fuel level in each critical region will be equal and neither volume of liquid fuel will be in a condition of criticality. The amount of liquid fuel initially injected into the system, at ambient temperature, is sufficient to fill one critical region to about the baffle height or slightly more and to fill the fluid carrying means including heat exchanging system located between the two reactors.

For the preferred liquid, the expansion of the liquid fuel, when the temperature is raised from ambient temperature to operating temperature, will amount to about 18 percent. Thus, during operation there will be a small portion of the inactive critical region filled with liquid fuel. For stable operation a portion of the inactive critical region should contain some liquid fuel.

Figure 2:
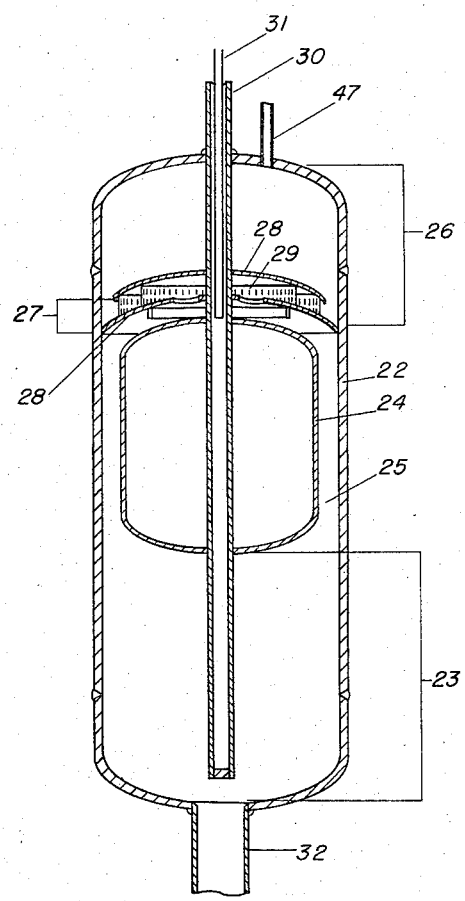
Figure 2 is detailed sectional view of one of the reactors.

The equilibrium liquid level condition is changed in the following manner. The inductance heating units 53 are activated to heat the liquid fuel in both critical regions. However, a temperature differential is maintained between the two critical regions. For the preferred embodiment, i. e., for a temperature swing of from 240° to 260°, the initial condition of criticality is attained when the critical region is just filled to the baffle; however, such a condition in the liquid fuel can be attained only if the liquid fuel is at a temperature less than about 250° C. Therefore, for this embodiment the liquid fuel is initially heated to a temperature of less than 250° by the induction heaters 53. Specifically, the liquid fuel in the reactor 20 is heated to a temperature of 243°, while the liquid fuel in reactor 21 is heated to a temperature of 240°. This temperature differential of 3° C., for the initial conditions of the preferred embodiment, creates a higher vapor pressure in reactor 20 and results in a liquid fuel level in reactor 21 which is at least about equal to the height of the baffle. The liquid fuel level in reactor 20 will be considerably lower. Criticality of the liquid fuel in the reactor 21 is not attained until after the safety rods 31 are removed. As the safety rods 31 are moved to their upper position in the vapor volume, as shown in Fig. 2, the liquid fuel in reactor 21 becomes critical and the temperature is raised from the initial value of 240° C. to a value of about 260° C., during which time the vapor pressure is increased so that a pressure differential is present between the vapor regions of reactor 20 and reactor 21, such a pressure differential being opposite to the initial pressure difference created by the 3° C. temperature differential. This pressure difference forces the liquid fuel out of reactor 21 into reactor 20.

Figure 3:
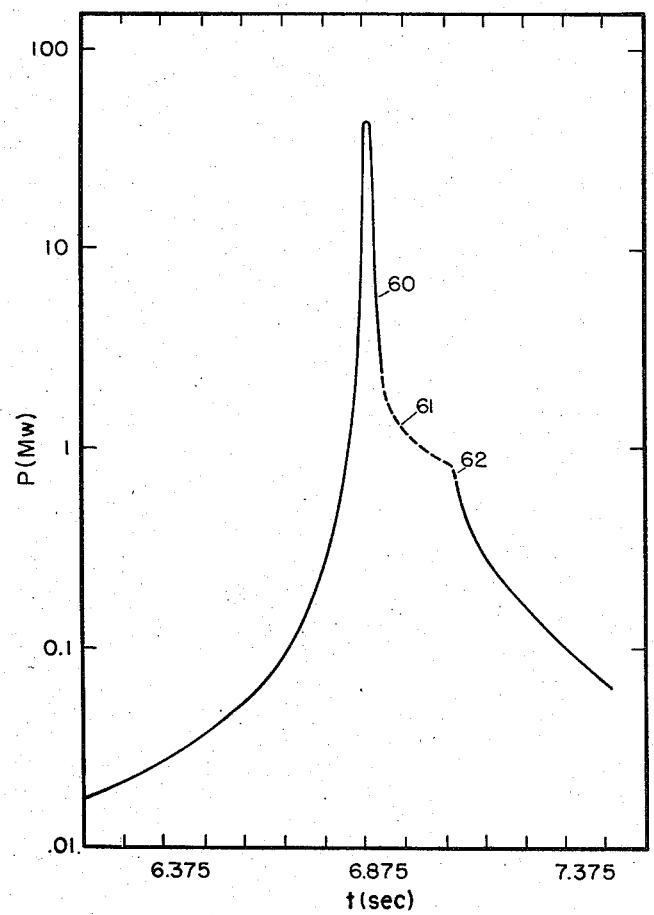
Figure 3 is a graph of one of the neutron bursts in terms of power and time.

The condition of criticality attained during operation is one of prompt critical and a neutron burst of the general shape and characteristics shown in Fig. 3 takes place. The curve 60 of Fig. 3 indicates that the maximum power developed, in terms of neutrons available, has a very sharp peak. As the power developed decreases, the effect of the delayed neutrons is apparent from the dotted portion 61 of the curve 60. At the point 62 of the curve 60, the effect of the liquid fuel level passing below the baffle 24 may be seen, i. e., the developed power decreases very rapidly after the liquid level passes this point.

Figures 4, 5:
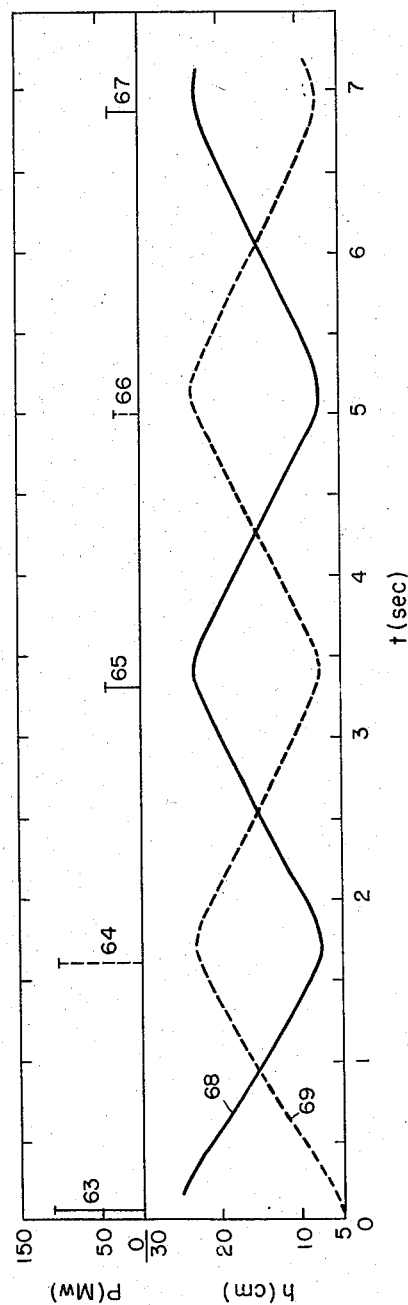
Figure 4 is a graph of peak power with respect to time.
Figure 5 is a graph of the liquid level of the liquid fuel in the two critical regions as a function of time.

Referring now to Fig. 4, it can be seen that the maximum power attained during the initial burst, as indicated by line 63, is considerably higher than the average power output of the preferred embodiment, where the average power is proportional to the area under the curve of Fig. 3. It should be noted, as can be seen by lines 64, 65, 66 and 67, that the peak power is reduced after the first few initial bursts. However, the average power, i. e., the area under the curve of Fig. 3 is not reduced, since the effect of the delayed neutrons is to broaden the width of the curve shown in Fig. 3. The lines 63, 65, and 67 represent the maximum power attained in reactor 21, while lines 64 and 66 represent the maximum power attained in reactor 20. During the first few cycles of reactor operation, the period between power bursts is not necessarily constant. However, after the stable condition is reached for the preferred embodiment, the stable period between power bursts in any one of the reactors will be about 3.5 seconds.

Figure 5 shows the relation between the heights of the liquid fuel in the reactor vessel and time. Curve 68 of Fig. 5 is for reactor 21, which is the first to reach a condition of criticality in the procedure outlined above. It should be noted that the maximum height of the liquid fuel reached in reactor 21 takes place shortly after the time at which the power burst takes place. This is also true during subsequent power bursts, as represented by lines 65 and 67. This is explained by considering the fact that the liquid level may attain a height which is past the baffle 24, whereas the condition of prompt criticality is generally reached when this liquid level approaches the bottom of baffle 24. Thus, the liquid above the baffle has little effect on the reactivity in the critical region, since a condition of prompt criticality has been attained before the maximum height has been reached. Since the temperature of the liquid fuel has been significantly raised in a short interval of time, the liquid will expand and the level of the liquid will exceed the baffle height. As the liquid fuel rises past the baffle the maximum temperature is controlled by the negative temperature coefficient of reactivity. Curve 69 of Fig. 5 is for reactor 20 and has the initial condition that only about 20 percent of the critical region is filled with liquid fuel. However, after the initial burst 63, the liquid fuel is forced out of reactor 21, as is indicated by the downward sloping portion of curve 68, and into reactor 20, as is indicated by the upward slope of curve 69. The fact that the second and subsequent maximums in the height of the liquid level are lower than the initial liquid level height indicates that the initial starting conditions were more extreme than was required to attain a condition of stable operation.

Figure 6 is a graph of the temperature of the liquid fuel in terms of time. Curve 70 indicates the liquid temperature in reactor 21, while curve 71 indicates the liquid temperature in reactor 20. It is apparent that reactor 21 has an initial starting temperature of 240°, while reactor 21 has an initial liquid fuel temperature of 243°. At the time of the maximum power burst 63, the temperature of the liquid fuel in reactor 21 is raised to a value of about 260°. After attaining a value of 260°, the temperature declines slowly to a point 72 corresponding to the time when the liquid fuel is again re-entering the reactor 21. At the point 72 cold liquid fuel starts to enter the reactor 21 and the temperature drops more rapidly and a minimum temperature is reached at point 73. During this time the temperature of the liquid fuel in reactor 20 is being decreased by the entrance of cold liquid fuel, which is passed through the heat exchangers 33 and 37. When the liquid height in the reactor 20 has reached its maximum value, as indicated by the first maximum of curve 69, a condition of criticality has already been reached in reactor 20, as is indicated by line 64. This condition results in a raising of the temperature of the liquid fuel in reactor 20 to a value of about 260°. Thus, relative movement and temperature of the liquid fuel is opposite in the two reactors providing a push-pull action.

Figure 7 is a graph of the velocity of the liquid fuel in terms of time, where the plus values indicate the flow of the liquid fuel into reactor 20. The curve 74 has an initial value of zero since, under the original starting conditions, the liquid fuel was not flowing. After the control rods are removed, the power burst 63 takes place and the temperature rises from 240 to 260° C. As a result the vapor pressure created in the vapor region 30 of reactor 21 forces the liquid fuel out at a velocity which increases rapidly until approximately the same time the maximum temperature is reached, as indicated in Fig. 6. The velocity then decreases slowly until the power burst 64 in reactor 20 takes place. At the time that the temperature in reactor 20 is increasing, i. e., at the time of power burst 64, the velocity into reactor 20 decreases to zero and reverses. The time at which the velocity is at zero corresponds to the time when the height of the liquid fuel in reactor 20 is at maximum.

Thus, it is apparent from Figs. 3 through 7 that the liquid fuel will be moved from one critical region to another with a condition of prompt criticality being attained in each critical region. These figures also indicate that, after the first few cycles, a stable state of operation is attained. The data which is represented by these figures is for the particular case of a reactor operating between 240 and 260° C. It is within the purview of the present invention to operate in either higher or lower temperature ranges depending upon what the initial condition of criticality is. As stated above, for the preferred embodiment, the initial condition of criticality is attained when the preferred liquid fuel just fills the critical region and is at a temperature not exceeding 250° C.

As is pointed out in the above-referenced co-pending application S. N. 589,835, the preferred liquid fuels require an initial overpressure of gas, i. e., oxygen or hydrogen, to maintain the liquid fuel thermally stable and to aid in corrosion protection. Such an overpressure of gas may be provided through pressure supply line 49, valve 48, and pressurizing line 47. The pressure supply line is connected to a source of the gas to be utilized. The overpressure is preferably provided during the time that the liquid level of each reactor is the same.

The time between consecutive power bursts and temperature rise during a burst determines the average power output of the reactor. This period may be changed by introducing a throttle valve 36 between the two reactors 20 and 21. Such a throttle valve may be used to increase the resistance to the flow of the liquid fuel between heat exchanger 33 and heat exchanger 37. It is also possible to use a restricting orifice as a throttling valve and to provide a by-pass such as is indicated in Fig. 1 by by-pass pipe 39. The valves 40 and 41 in by-pass conduit 39 may be operated remotely to control the amount of throttling which is accomplished by the orifice in throttle valve 36.

In comparing the temperature swing during the operation of one of the reactors for a system which is throttled, to one which is unthrottled, it has been found that the throttled system results in an average power output which is between 10 and 30 percent of the unthrottled system value. These values are based upon the assumption that the average power, to a first approximation, is directly proportional to the period.

Should the pressure in the system exceed a predetermined maximum, for example, 2000 p. s. i., the rupture discs 43 would operate to remove the liquid fuel through reservoir line 44 to a non-critical reservoir 45. The valve 46 remains in a closed position during normal operation. Shut-down is accomplished by inserting the control rods 31 into the critical regions.

Although the preferred embodiment utilizes liquid fuels consisting of uranium phosphate, phosphoric acid and water, it is within the purview of this invention to use conventional homogeneous reactor liquid fuels, such as uranyl sulfate and uranyl nitrate. Such liquid fuels would require low operating temperatures because of their thermal instability at higher temperatures.

While presently preferred embodiments of the invention have been described, it is clear that many other modifications may be made without departing from the scope of the invention. For example, such modifications may include the use of cycling control rods, i. e., rods which are automatically moved into and out of the critical regions with a predetermined but variable oscillatory period, to change the power burst cycle period, or the use of an initial pressure differential during start-up which is a result of supplying different initial overpressures of gas. Therefore, the present invention is not limited by the foregoing description but solely by the appended claims.

What is claimed is:

1. A homogeneous nuclear reactor system comprising in combination a first closed vessel defining a first constant volume critical volume, a second closed vessel defining a second constant volume critical volume, fluid carrying means connecting the bottom of said first critical volume to the bottom of said second critical volume, heat exchanger means located in said fluid carrying means, a quantity of liquid fissionable nuclear fuel in said system sufficient at ambient temperature to approximately fill one of said critical volumes and said fluid carrying means, and means for moving said fuel through said fluid carrying means to alternately depress the level of said fuel in one said critical volume at least below the level required for neutronic criticality and raise the level in said other critical volume to the level required for prompt neutronic criticality.

2. A homogeneous nuclear reactor system comprising a first vessel defining a first constant volume critical volume, a second vessel defining a second constant volume critical volume, each vessel also defining a vapor volume above each of said constant volume critical volumes, fluid carrying means connecting the bottom of said first critical volume to the bottom of said second critical volume, heat exchanger means located in said fluid carrying means, a quantity of liquid fissionable fuel in said system sufficient at ambient temperature to approximately fill one of said critical volumes and said fluid carrying means, means for alternately transferring a quantity of said liquid fuel from one of said constant volume critical volumes to said fluid carrying means and for transferring another such quantity of liquid fuel from said fluid carrying means to the other of said constant volume critical volumes, said last named means including said vapor volumes, said quantity of liquid fuel transferred from said first critical volume being sufficient to depress the remaining fuel below neutronic criticality and said quantity of liquid fuel transferred to said second reactor when added to any said liquid fuel thereinbefore present being sufficient to attain prompt neutronic criticality therein.

3. The nuclear reactor of claim 2 wherein said fluid carrying means has a volume approximately equal to one of said critical volumes of said vessels.

4. A homogeneous nuclear reactor comprising a first vessel containing a constant volume critical volume, a non-critical vapor volume above said critical volume, a baffle located between said critical volume and said vapor volume, said baffle defining the upper extremity of said critical volume, a second vessel containing a constant volume critical volume, a second non-critical vapor volume above said second critical volume, a second baffle between said second critical volume and said second vapor volume, said second baffle defining the upper extremity of said second critical volume, fluid carrying means connecting the bottom of said first critical volume of said first vessel to the bottom of said second critical volume of said second vessel, heat exchanger means located in said fluid carrying means, a quantity of liquid fissionable nuclear fuel in said system sufficient at ambient temperature to approximately fill one of said critical volumes of said vessels and said fluid carrying means, and means including said first and second vapor volumes and said first and second baffles for alternately filling said first and second constant volume critical volumes to a level at least as high as said baffles so that a condition of prompt nuclear criticality is alternately attained in said first and second critical volumes and said liquid fuel is transferred from one of said constant volume critical volumes to the other of said constant volume critical volumes by means of the pressure in said vapor volumes.

5. The homogeneous nuclear reactor of claim 4 wherein said fluid carrying means includes means for variably throttling the liquid flow between said first and second constant volume critical volumes.

6. The homogeneous nuclear reactor of claim 4 wherein said fluid carrying means includes means for throttling the flow of liquid fuel between said first and second constant volume critical volume, and wherein variable flow duct means is provided by-passing said throttling valve.

7. The homogeneous nuclear reactor of claim 4 wherein said first and second constant volume critical volumes are enclosed by neutron reflecting means, and wherein means external to said constant volume critical volumes are provided for selectively heating the liquid fuel within said first and second constant volume critical volumes.

8. The homogeneous nuclear reactor of claim 4 wherein said fluid carrying means has a volume approximately equal to the volume of one of said constant volume critical volumes.

9. A homogeneous nuclear reactor system comprising a first reactor vessel and a second reactor vessel, said first and second reactor vessels each containing a critical volume, a non-critical vapor volume, and a baffle separating said critical volume from said non-critical vapor volume, fluid carrying means connecting the bottom of the said critical volume of said first reactor vessel with the bottom of said critical volume of said second reactor vessel, a quantity of liquid fissionable nuclear fuel in said system, said quantity being sufficient at ambient temperature to fill one critical volume and said fluid carrying means, said fluid carrying means including means for extracting heat from said liquid fuel, means for selectively heating the liquid fuel in said critical volumes whereby an initial temperature differential may be created between the subcritical quantities of liquid fuel in said first and second reactor vessels, said temperature differential resulting in a pressure differential between said vapor volumes thereby raising the liquid level in one of said critical volumes to at least said baffle, means for attaining a condition of prompt criticality in said one critical volume, thereby creating a pressure in said vapor volume which forces the liquid fuel from said one critical volume through said fluid carrying means and said heat extraction means to the other of said critical volumes.

10. The homogeneous nuclear reactor system of claim 9 wherein said baffle consists of a hollow, closed container centrally disposed in said first and second reactor vessels, said container forming a cylindrical, non-critical channel, said channel connecting said critical volumes with said vapor volumes.

11. The homogeneous nuclear reactor system of claim 9, wherein said fluid carrying means includes means for variably throttling the flow of liquid fuel between said critical volumes.

12. The homogeneous nuclear reactor system of claim 9 wherein said fluid carrying means has a volume approximately equal to one of said critical volumes.

13. A homogeneous nuclear reactor comprising a first vessel defining a first constant volume critical volume, a second vessel defining a second constant volume critical volume, fluid carrying means connecting the bottom of said first critical volume with the bottom of said second critical volume, heat exchanger means located in said fluid carrying means, a quantity of aqueous liquid fissionable nuclear fuel in said system sufficient at ambient temperature to fill one of said critical volumes and said fluid carrying means, each said vessel also defining a vapor confining volume above each of said critical volumes for confining vapor and gases evolved from said heated liquid fuel, whereby said confined vapor and gases will force said liquid fuel out of one of said critical volumes into the other of said critical volumes when a predetermined pressure exists in said vapor confining means.

14. The reactor of claim 13 wherein said vapor volumes defined by said vessels contain means for recombining radiolytically dissociated hydrogen and oxygen.

References Cited in the file of this patent

"Proceedings of the International Conference on the Peaceful Uses of Atomic Energy," vol. 3, held in Geneva 8–20, 1955. Library date Dec. 27, 1955 pp. 283–286, 265–272.

LA–1942, U. S. Atomic Energy Commission by L. D. P. King, Apr. 13, 1955 pp. 4–15 (available from AEC Technical Information Service, Oak Ridge, Tenn.)

NAA–SR–1525, Program Review of the Water Boiler Reactor Kinetic Experiments, by Atomics International, issue date Mar. 15, 1956, pp. 23–32.